(12) United States Patent
Wu et al.

(10) Patent No.: US 8,197,372 B2
(45) Date of Patent: Jun. 12, 2012

(54) POWER TRANSMISSION BELT

(75) Inventors: Shawn Xiang Wu, Rochester Hills, MI (US); Lance C. Hall, Wilkesboro, NC (US)

(73) Assignee: The Gates Corporation, Denver, CO (US)

(*) Notice: Subject to any disclaimer, the term of this patent is extended or adjusted under 35 U.S.C. 154(b) by 1363 days.

(21) Appl. No.: 11/399,788

(22) Filed: Apr. 7, 2006

(65) Prior Publication Data

US 2007/0249451 A1    Oct. 25, 2007

(51) Int. Cl.
*F16G 9/00* (2006.01)

(52) U.S. Cl. .................................. 474/263; 474/260

(58) Field of Classification Search .............. 474/260, 474/263
See application file for complete search history.

(56) References Cited

U.S. PATENT DOCUMENTS

| | | | |
|---|---|---|---|
| 3,305,429 A * | 2/1967 | Stadden | 442/334 |
| 3,485,706 A * | 12/1969 | Evans | 428/134 |
| 3,550,464 A * | 12/1970 | Yagii et al. | 474/268 |
| 3,616,175 A * | 10/1971 | Jung | 442/414 |
| 3,800,610 A | 4/1974 | Wach | |
| 3,818,741 A | 6/1974 | Terhune | |
| 4,139,406 A | 2/1979 | Richmond et al. | |
| 4,392,842 A | 7/1983 | Skura et al. | |
| 4,626,232 A * | 12/1986 | Witt | 474/205 |
| 4,822,324 A * | 4/1989 | Georget | 474/268 |
| 4,892,510 A | 1/1990 | Matsuoka et al. | |
| 4,895,555 A | 1/1990 | Watanabe et al. | |
| 4,937,925 A | 7/1990 | McGee, Jr. | |
| 5,286,542 A | 2/1994 | Susi et al. | |
| 5,322,479 A * | 6/1994 | Le Devehat | 474/101 |
| 5,495,935 A | 3/1996 | Zabron et al. | |
| 5,536,214 A | 7/1996 | Akita et al. | |
| 5,645,504 A | 7/1997 | Westhoff | |
| 5,733,399 A | 3/1998 | Wood | |
| 5,741,197 A | 4/1998 | Akita et al. | |
| 5,971,879 A | 10/1999 | Westhoff | |
| 6,406,577 B1 | 6/2002 | Benedict et al. | |
| 6,409,621 B1 | 6/2002 | Billups et al. | |
| 6,464,607 B1 | 10/2002 | Rosenboom et al. | |
| 6,491,598 B1 | 12/2002 | Rosenboom | |

(Continued)

FOREIGN PATENT DOCUMENTS

EP        0 481 652 B1    10/1991

(Continued)

*Primary Examiner* — Bradley King
*Assistant Examiner* — Mahbubur Rashid
(74) *Attorney, Agent, or Firm* — P. N. Dunlap, Esq.; J. A. Thurnau, Esq.; T. A. Dougherty

(57) ABSTRACT

A power transmission belt comprising a body comprising an elastomeric material and having tensile members running in a longitudinal direction, the body having a pulley engaging region having a profile; the pulley-engaging region comprising a fibrous nonwoven fabric material; characterized in that the fibers of the nonwoven material comprise acrylic fibers. The acrylic fibers are preferably micro-fibers of less than about 1.5 dpf and having an average diameter of 13.5 microns or less and an average length of about 1 to about 10 mm. The nonwoven material may be commingled with the elastomeric material in the pulley engaging region. Up to about 75% by weight of the fibers of the nonwoven material may comprise non-acrylic fibers such as other synthetic fibers, natural fibers, or cellulosic fibers.

26 Claims, 2 Drawing Sheets

U.S. PATENT DOCUMENTS

| | | |
|---|---|---|
| 6,561,937 B1 | 5/2003 | Wegele |
| 6,595,883 B1 | 7/2003 | Breed et al. |
| 6,609,990 B2 | 8/2003 | Kopang |
| 6,695,733 B2 | 2/2004 | Knutson |
| 6,793,599 B2 | 9/2004 | Patterson et al. |
| 6,824,485 B2 | 11/2004 | Edwards et al. |
| 6,855,082 B2 * | 2/2005 | Moncrief et al. ............. 474/263 |
| 6,858,664 B2 * | 2/2005 | Wentworth et al. ........... 524/315 |
| 6,991,692 B2 | 1/2006 | Patterson et al. |
| 7,137,918 B2 * | 11/2006 | Nonnast et al. ................ 474/260 |
| 2001/0044354 A1 * | 11/2001 | Yuan et al. .................... 474/260 |
| 2003/0139242 A1 | 7/2003 | Teves et al. |
| 2004/0048708 A1 | 3/2004 | Nonnast et al. |
| 2004/0204275 A1 | 10/2004 | Burrowes et al. |

FOREIGN PATENT DOCUMENTS

| | | |
|---|---|---|
| EP | 0 774 597 B1 | 4/1996 |
| EP | 1 108 750 B1 | 12/2000 |
| JP | 57149646 | 9/1982 |
| JP | 2004-174772 A | 6/2004 |

* cited by examiner

POWER TRANSMISSION BELT

BACKGROUND OF THE INVENTION

The invention relates to power transmission belts having an engineered surface and more particularly, to power transmission belts having an engineered surface comprising a region having a nonwoven material comprising acrylic fiber.

It is known in the art to make power transmission belts from elastomeric materials having an embedded tensile member. The belts may describe a multi-rib, toothed, v-belt, or flat profile. The belts run in pulleys having a matching profile.

It is known to cover belt surfaces, including the back, sides, profile, and/or the rib flanks with various textile materials or fibers to modify the wear resistance, frictional properties, crack resistance, stiffness, and/or strength characteristics of the surface and/or the underlying elastomeric region. Special fabric characteristics and/or processes may be required to mold a profile. For example, a fabric can be preformed into the profile shape before molding, a tedious process step. More commonly, to avoid the preforming step, a fabric-covered toothed belt made by the flow-through process on a toothed mold requires a fabric that is expandable, such as one with a very low modulus and high elongation in at least one direction. A fabric-covered notched or toothed v-belt or multi-v-ribbed belt made inverted on a flat mandrel by pressing with a profiled outer mold likewise requires a fabric with high elongation (typically 40 to 100%) and with a low modulus in order to stretch from the initial flat configuration to the final profiled configuration without tearing or restricting profile formation. Satisfactory woven and knit fabrics comprising a variety of fiber materials are known for such applications. Representative of the art is U.S. Pat. No. 5,645,504 to Westhoff, wherein it is suggested that aramid, cotton, rayon, and acrylic yarns would be useful in weft-knitted, stretch fabrics for belt covering or reinforcement in clutching applications, because these materials have high enough melting temperatures to withstand the frictional heat in such applications. The only representative example provided was a belt with a knit fabric of yarns of aramid-rayon blend. Knit and woven fabrics with high stretch suitable for belts are relatively expensive.

A flocking process is known for manufacturing belts with a highly controlled amount and orientation of fiber on a belt surface. Representative of the art is U.S. Pat. No. 6,561,937 to Wegele, wherein the fabric on the drive surface of the belt is covered with perpendicularly oriented short fiber flock by means of an adhesive. A long list of fiber materials ostensibly may be used for the flock, including acrylic fibers, but no rationale is offered to aid in selecting a fiber type, and no acrylic examples are provided. Flocking adds additional process steps to the belt manufacturing process and requires specialized equipment.

Nonwoven fabrics (often referred to as "nonwovens") have been proposed for covering profiled belt surfaces. Representative of the art is U.S. Pat. No. 6,793,599 to Patterson et al., U.S. Pat. No. 6,824,485 to Edwards et al., and U.S. Pat. No. 6,609,990 to Kopang. Nonwoven fabrics can provide an open structure that is easily penetrated by elastomer during molding, or a more closed structure that leaves a high concentration of fiber at the surface, and a variety of fabric materials are available for achieving desired frictional., thermal, and mechanical characteristics in the belt. Nonwovens can be processed in conventional belt-making equipment and offer cost savings over knits and woven fabrics.

In practice, however, it has been found that prior art nonwoven fabrics based on cellulosic fibers and cellulosic/synthetic blends have one or more undesirable characteristics. First, cellulosic materials have relatively poor durability, especially under wet operating conditions. Second, prior nonwovens have very limited stretch or elongation. Typically, in a tensile test, nonwovens stretch only 2 to 10% and then yield or tear so that subsequent extension is highly localized in the region of the tear. Likewise, when nonwovens are subjected to stretching during molding, the randomly arranged fibers simply slide over one another and separate, including breaking any bonds between fibers formed by adhesive binders if used. Unlike woven or knit fabrics, the stretching of nonwovens is very difficult to control, and frequently holes or tears are created by the separating fibers. Holes and tearing leads to irregular belt surfaces, excess rubber strike-through, and/or patches of exposed elastomer, resulting in poor wear resistance, noise, and/or poor friction control. Third, it has previously been difficult to control the penetration of rubber into the nonwoven fabric to achieve a desired surface characteristic, particularly when coupled with the tearing problem. Even after extensive investigation into the manipulation of known fabric variables, such as porosity, permeability, thickness, and tensile strength, or process variables, such as using multiple layers of nonwovens, improvements in processing and performance are needed.

Having investigated a large number of synthetic, natural, and blended nonwoven fabric materials, none of which produced belts entirely free of the previously mentioned defects, the inventors finally discovered a solution in the invention disclosed herein. What is needed is a power transmission belt having a pulley-engaging region comprising a nonwoven surface material, on or commingled with the underlying elastomer of the belt body, wherein the nonwoven material comprises acrylic fibers optionally blended with up to about 75% non-acrylic fibers, such as cellulosic fibers. What is needed is a power transmission belt with a multi-ribbed profile and having a nonwoven pulley-engaging surface layer and a compressive layer, with the nonwoven layer comprising acrylic fibers or micro-fibers, optionally blended with up to about 75% non-acrylic fibers. The present invention meets these needs.

BRIEF SUMMARY OF THE INVENTION

The primary aspect of the invention is to provide a power transmission belt comprising a body comprising an elastomeric material and having tensile members running in a longitudinal direction, the body having a pulley engaging region having a profile; the pulley-engaging region comprising a fibrous nonwoven fabric material; characterized in that the fibers of the nonwoven material comprise acrylic fibers.

In another aspect of the invention, the fibers of the nonwoven material comprise at least about 25% by weight acrylic fibers.

In another aspect of the invention, the nonwoven material is commingled with the elastomeric material of the body in the pulley engaging region.

In another aspect of the invention, the acrylic fibers are acrylic micro-fibers having a fiber size of about 1.5 or less denier per filament (dpf), preferably about 1.0 dpf or less, or the fibers may have an average diameter of about 13.5 microns or less, preferably 11 microns or less. The acrylic fibers may have an average length of from about 1 to about 10 mm, preferably from about 1 to about 6 mm, or from about 2 to about 5 mm.

In another aspect of the invention, up to about 75% of the fibers of the nonwoven material may comprise non-acrylic fibers such as other synthetic fibers, natural fibers, or cellulosic fibers.

Another aspect of the invention is to provide a power transmission belt with a multi-ribbed profile and having a nonwoven pulley-engaging surface layer and a compressive layer, with the nonwoven layer comprising acrylic fibers or micro-fibers, optionally blended with up to about 75% cellulosic fibers.

Another aspect of the invention is to provide an improved method of manufacturing a belt comprising the steps of: laying up a first elastomeric and/or textile layer of a belt build on a mandrel; laying up tensile cords on the first layer; laying up a second elastomeric layer on the tensile cord layer; laying up a fibrous nonwoven fabric region on the second elastomeric layer; curing the belt build in a profile-forming mold; and selecting for the nonwoven region an acrylic nonwoven fabric.

Other aspects of the invention will be pointed out or made evident by the following description of the invention and the accompanying drawings.

DETAILED DESCRIPTION OF THE INVENTION

Figure 1:
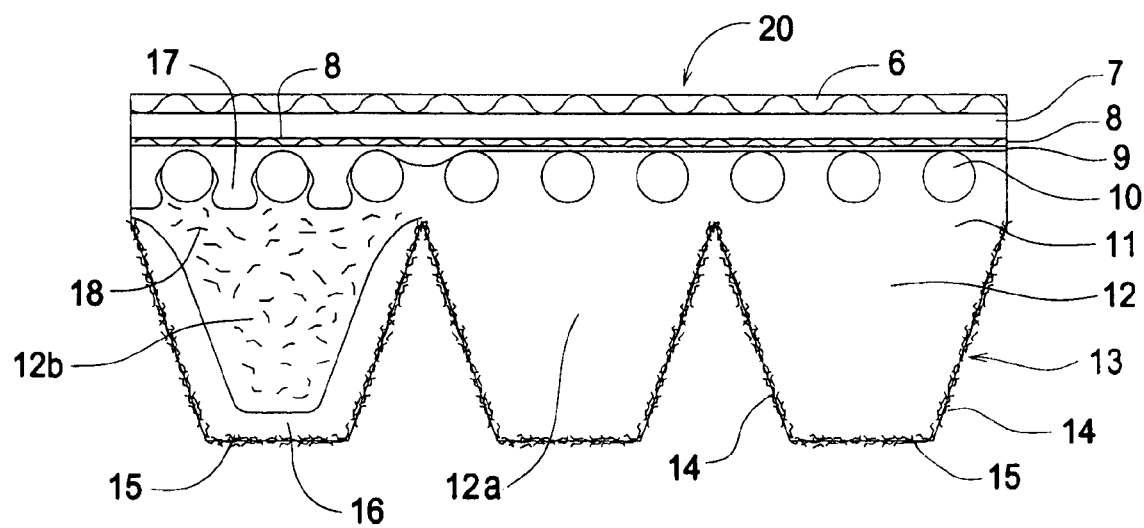
FIG. 1 is a side cross-sectional view of an embodiment of the inventive belt.

FIG. 1 is a cross-sectional view of an embodiment of the inventive belt 20. Belt 20 comprises body 11 and pulley engaging ribs 12 running in a longitudinal direction. Belt 20 also comprises load carrying tensile members 10 that run along a longitudinal axis of the belt. Tensile members 10 may comprise, for example, any organic or inorganic fiber tensile cord material known in the art including aramid, polyester, nylon, glass, carbon, polyvinylalcohol (PVAL), steel wire, rayon, poly(p-phenylene-2,6-benzobisoxazole) (PBO), liquid crystal polyester (sold under the tradename Vectran), polyether-etherketone (PEEK), polyketone (POK), and various natural fibers. A polyester fiber may comprise, for example, polyethylene terephthalate (PET) or polyethylene naphthalate (PEN).

Ribs 12 comprise an elastomeric rib material which may be comprised solely of rubber, as illustrated by rib 12a. Alternately, ribs 12 may further comprise fibers 18 dispersed throughout an elastomeric rib material as illustrated by rib 12b. The elastomeric material may comprise EPDM, EPM, EOM, EBM, SBR, NBR, NR, HNBR, polychloroprene, millable PU, or blends of two or more of these and their equivalents. Belt 20 may also optionally comprise a jacket 6 and/or an overcord 7 on the backside. Jacket 6 may comprise a fabric material of nylon, polyester, cotton or other appropriate equivalent fabrics including blend fabrics. Jacket 6 may comprise a thermoplastic or thermoset material, such as nylon, polyurethane, polyethylene and their equivalents. Jacket 6 may be woven, knit, or nonwoven. Overcord 7 may be of any suitable elastomeric material. The belt back surface may be textured, for example, by molding or grinding or cutting or by use of a textured fabric.

Belt 20 may also optionally comprise a cross-cord layer 8 adjacent to tensile members 10 across a width of the belt. Cross-cord layer 8 may be substantially nonporous so that essentially no elastomeric material penetrates cross-cord layer 8 during a molding process, thereby maintaining a proper tensile member position within the belt. Cross-cord layer 8 may comprise woven or nonwoven material, for example nonporous tire cord. A thin gum layer 9 may optionally be disposed between cross-cord layer 8 and tensile members 10 in order to cushion tensile members 10 and thereby avoid abrading the tensile members. Thin gum layer 9 may extend between the tensile members 10, forming lobes 17 between the tensile members. An additional gum layer (not shown) may also be provided on the opposite side of the cord if complete encapsulation of the cord is desired. Alternately, cross-cord layer 8 may be porous, so that overcord 7 material interpenetrates the cross-cord material during molding, thus possibly forming lobes 17 between the tensile members with or without the use of gum layer 9.

Ribs 12 may comprise any number of ribs and any profile required by a user. FIG. 1 depicts a multi-v-ribbed profile. Though rib 12b is portrayed differently from rib 12a in order to illustrate different embodiments of the invention, it should be understood that the ribs 12 in multi-ribbed belts are generally all of the same construction. The belt may also comprise a single-rib v-belt profile. The belt may also comprise a toothed profile wherein the ribs or teeth are transversely oriented, including toothed synchronous belts carrying a fabric jacket as a tooth facing.

Pulley engaging region 13 may comprise a random array of nonwoven fabric material commingled and interpenetrated with the material of the rib 12, thereby forming nonwoven region 15. Thus, nonwoven region 15 may or may not have a discrete boundary between the nonwoven containing area and the rib material. Depending on the extent of commingling, both nonwoven material and elastomer may be present at a pulley engaging surface 14, or only nonwoven material may be present at a pulley engaging surface 14. Preferably, a high concentration of acrylic fiber and minimal elastomer is present at a pulley engaging surface.

Rib 12b illustrates an alternative embodiment in which a subsurface region 16 resides between pulley engaging nonwoven region 15 and the material of rib 12b. Subsurface region 16 comprises an elastomeric friction material that is distinct from that of the body 11 and rib 12b. The elastomeric material of subsurface region 16 commingles and interpenetrates with the nonwoven fabric material. The thickness of the subsurface region 16 may be uniform, or it may vary around the profile such as illustrated in FIG. 1. Thickness variation may be a result of a method of manufacture.

The elastomeric material of rib 12 or subsurface region 16 may optionally comprise a friction modifier. By way of example and not of limitation, friction modifiers may include waxes, oils, graphite, boron nitride, molybdenum disulfide, fluoropolymers, mica, talc, and various blends and equivalents thereof. Graphite friction modifier may be in particulate or fiber form. A friction modifier may comprise a metal salt of carboxylic acid as described in U.S. Pat. No. 6,824,485, which is hereby incorporated by reference.

The thickness of the nonwoven region may be a major contributor to the stiffness of the rib or the belt. For a flexible belt, it is desirable to make the nonwoven region as thin as possible and the subsurface region at least thick enough to accommodate the amount of wear anticipated. For a stiff rib (transversely) and flexible belt (longitudinally), it is desirable to orient the nonwoven so that a direction having a preferred fiber orientation is transverse to the belt length.

Nonwoven region 15 may comprise a single layer or a plurality of overlaid layers of nonwoven material infused with elastomeric material. A frictional modifier can be used in the nonwoven region 15 to help control the coefficient of friction (COF) of the outer surface of the nonwoven region. By way of example and not of limitation, friction modifiers may include waxes, oils, graphite, boron nitride, molybdenum disulfide, fluoropolymer, mica, talc, metal salt of carboxylic acid, and various blends and equivalents thereof as described in connection with the subsurface region 16. The friction modifier may be applied to the nonwoven material during formation by a wet or dry process, or in a separate treatment process before assembly of the belt, and thus may be in addition to any optional friction modifier contained in the interpenetrating elastomeric material of the optional subsurface region 16 or the material of the rib 12.

The nonwoven material comprises acrylic fibers. According to common usage, acrylic fiber is a synthetic fiber in which the fiber-forming substance is any long-chain synthetic polymer composed of at least about 85% by weight of acrylonitrile monomer units. A manufactured fiber in which the fiber-forming substance is any long chain synthetic polymer composed of less than 85 percent but at least 35 percent by weight of acrylonitrile units is commonly called "modacrylic" fiber. Either acrylic or modacrylic may be used in the present invention. References to acrylic fiber herein refer to both forms, i.e., acrylic herein refers to any manufactured fiber with at least 35% by weight of acrylonitrile units. A preferred acrylic has at least about 85% by weight acrylonitrile units. Any acrylic fiber suitable for use in any of the known nonwoven manufacturing processes may be used including tow, staple, chopped, pulp, ground, and the like. A suitable acrylic fiber may have an average length of from about 1 mm to about 10 mm, preferably from about 1 mm to about 6 mm, or from about 2 mm to about 5 mm. A suitable acrylic fiber may have a filament size of from about 0.05 to about 5 denier per filament (dpf), or preferably from about 0.05 to about 1.5 dpf. Denier is defined as the weight in grams per 9000 meters of fiber. A preferred acrylic fiber is acrylic micro-fiber having a filament size of less than about 1 dpf, or from about 0.05 to about 1 dpf. The fibers may have an average diameter less than about 13.5 microns, or preferably less than about 11 microns, or less than about 5 microns. It should be understood that fiber diameter is related to dpf.

The nonwoven may have a basis weight in the range of from about 4 $g/m^2$ to about 90 $g/m^2$. A suitable nonwoven may have a basis weight in the range of from 10 $g/m^2$ to about 50 $g/m^2$. In a preferred embodiment the basis weight is in the range of from 14 $g/m^2$ to about 25 $g/m^2$, and two plies or layers of nonwoven may be used. The porosity of the nonwoven material may be indicated by air permeability measurements using the Frazier® (trademark of Frazier Precision Instrument Company, Inc.) differential pressure air permeability measuring instrument and/or a standardized method such as ASTM D737 or equivalent. The porosity of the nonwoven material may be in the range of from about 20 to about 400 $cm^3/s$ per $cm^2$ at 12.7 mm water pressure differential (about 40 to about 800 $ft^3/min$ per $ft^2$ at ½-inch of water). Preferably, the porosity of the nonwoven material may be in the range of about 30 to about 200 $cm^3/s$ per $cm^2$ at 12.7 mm water. A preferred nonwoven has porosity in the range of about 60 to about 200 $cm^3/s$ per $cm^2$ at 12.7 mm water and two layers may be used. Of course, the actual porosity in practice would be reduced significantly by the use of more than one layer of nonwoven. Preferably the resulting porosity (i.e. permeability) of the multiple layers is in a specified range.

The nonwoven may comprise a web of randomly oriented fibers, or the fibers may have some degree of orientation arising from the processing conditions and equipment used to manufacture it. As a result, the tensile strength of the nonwoven may be somewhat different in the machine direction than in the transverse direction. The average tensile strength may range from about 170 to about 2000 g/cm (based on the force per unit width to pull the sample). Preferably the average tensile strength may range from about 200 to about 1500 g/cm or from about 400 to about 700 g/cm.

The thickness of the nonwoven region 15 may be about 0.025 mm or greater. The thickness of the nonwoven material may be in the range from about 0.05 to about 1.2 mm. Preferably the thickness of the nonwoven material is from about 0.05 to about 0.6 mm or from about 0.05 to about 0.3 mm. If the nonwoven is too thick, either the elastomer will not sufficiently penetrate the nonwoven, or the nonwoven will resist the flow of elastomer into the mold and fail to produce proper profile shapes. If the nonwoven is too thin, either it will tear, or it will permit too much elastomer penetration, resulting in rubber strike-through and too much rubber on the surface.

The nonwoven fabric may comprise non-acrylic fibrous materials in addition to a predetermined amount of acrylic fiber. It is believed that any amount of suitable acrylic fiber added to an otherwise non-acrylic nonwoven fabric formulation will improve an aspect of the performance of the nonwoven in an embodiment of the invention. The acrylic fiber content of the nonwoven material may be from about 25% to 100% by weight based on the total fiber content of the nonwoven. Preferably, the acrylic fiber content of the nonwoven material is from about 40% to 100% by weight. The nonwoven may comprise natural, organic, or cellulosic fibers including for example softwood pulp, hardwood pulp, wood flour, flax, jute, hemp, kanaf, cotton, kapok, sisal, wool, silk, or other cellulosic fibers, or a combination thereof. The nonwoven may comprise other synthetic, inorganic fibers including aramid, carbon, polyester, polyolefin, polyimide, PVAL, rayon, fiberglass, basalt, or nylon. The nonwoven may comprise up to about 75% by weight of the total fiber content of the aforementioned non-acrylic fibers or combinations thereof, and at least about 25% of the total fiber content comprises acrylic fibers. Preferably, up to about 60% by weight of the fibers of the nonwoven comprise non-acrylic fibers.

The nonwoven may also comprise additional ingredients known in the art to impart advantageous processing characteristics or physical properties to the nonwoven. For example, the nonwoven may comprise sizing, chemical binders, and/or adhesive resins including rubber adhesion promoters. Chemical binders may be formulated for example with surfactants, thickeners, dyes, pigments, crosslinkers, acids and bases, fillers and the like, and the binder may typically comprise from about 0.5% to about 35% of the total nonwoven dry weight. Useful rubber adhesion promoters include, for example, latex, blocked isocyanates, triallylcyanurate, acrylics, urethanes, epoxies, resorcinol-formaldehyde resins, phenolic resins, chlorophenol resins, hydrocarbon resins, rosin esters, melamine resins, long chain mono-, di-, or tri-esters of fatty acids or alcohols, and the like and combinations thereof. Beneficial adhesion promoters are described for example in U.S. Pat. No. 6,858,664. In addition to chemical bonding or instead of chemical bonding, mechanical bonding, thermal bonding, spun-bonding, or solvent bonding, or combinations of the foregoing may be employed. Mechanical bonding techniques include for example, needlepunching, stitch bonding, and hydroentanglement. The degree of bonding is an important factor in determining the strength, porosity, and density of the nonwoven. A suitable nonwoven, as a non-limiting example, comprises from about 0.5% to about 25% by weight chemical binder with the binder composition based on PVAL. A suitable nonwoven, as a non-limiting example may comprise a chemical binder composition comprising from about 1% to about 15% by dry weight a rubber adhesion promoter as a component of the chemical binder composition.

Fibers 18 may be included in the matrix of the elastomeric body 11 and/or overcord 7 and/or rib 12, and/or the optional subsurface region 16. Fibers 18 may further decrease rib surface sloughing or deformation and/or chatter or noise. The fibers may be synthetic or natural, organic or inorganic and may include aramid, carbon, polyester, polyolefin, polyimide, PVAL, rayon, acrylic, fiberglass, and nylon, and blends and equivalents thereof. Other organic fibers may include wool, silk, hemp, cotton, and blends and equivalents thereof. The amount of fibers used in the rib elastomer may be in the range of 0 to about 25 parts fiber per hundred parts of rubber (PHR). An exemplary embodiment utilizes from about 0.01 to about 5 parts fiber per hundred parts of rubber. The nonwoven region allows a dramatic reduction in the percentage of flock or fiber loading required in the undercord rib materials. This change has resulted in improved belt performance due to enhanced resilience and bending of the undercord constructions.

Compared to prior art belts having 100% wood-pulp nonwovens, or wood-pulp/synthetic blend nonwovens, the use of acrylic fiber in the nonwoven significantly improves the durability of the pulley-engaging surface and the slip noise performance of the inventive belt under both wet and dry test conditions and for both new belts and belts broken in by extended testing. The use of acrylic in the nonwoven significantly modifies a frictional characteristic of the belt and improves the stability of the COF of the belt over the useful life of the belt. The use of acrylic in the nonwoven significantly improves the ease of manufacture of the belt and the consistency of the nonwoven surface layer of the resulting belts.

The elastomeric material formulations of the optional subsurface region, the belt body, and the overcord optionally but preferably include one or more additional conventional elastomeric additives, process and extender oils, antioxidants, waxes, pigments, plasticizers, softeners, tackifiers, fillers, activators, accelerators, scorch retarders, vulcanization agents, lubricants, and the like, according to common rubber processing practice. For example, in a preferred embodiment of the present invention, the elastomeric materials also comprise carbon black, a plasticizer, antioxidants, coagent, peroxide, and a cure retarder.

Method of Manufacture

The inventive belt may be built up, inverted, on a mandrel in a series of layers. Jacket 6, if present, is laid up first. Elastomeric overcord 7 of the belt is laid-up next. Each succeeding elastomeric layer is laid upon the previously applied layer. Optional cross-cord layer 8 may be applied upon overcord 7. Tensile cords 10 are applied by spiral winding on cross-cord layer 8 if present, or onto overcord 7 or jacket 6 as appropriate. A gum layer 9 may be applied between the tensile cords 10 and cross-cord layer 8 in order to provide a cushion for tensile cords 10. The elastomeric undercord or body 11 is then applied over the tensile cords 10. The optional elastomeric subsurface region 16 is applied next to last in a predetermined amount. The subsurface region 16 may comprise one or more layers of elastomeric material. The final layer applied to the build upon the elastomeric subsurface layer 16 or the undercord or body 11 is the nonwoven material comprising region 15.

The nonwoven region may comprise one or more layers of nonwoven material. In a preferred embodiment, two layers of acrylic nonwoven material are used. It is known that nonwoven layer or layers have the added advantage of allowing gases developed during the curing process to vent or escape from the edges of the mold. However, proper interpenetration of the elastomeric material of the undercord into the nonwoven material, thereby forming region 15, has been very difficult to achieve. The inventors have found that nonwoven materials based on acrylic fibers, optionally including up to about 75% cellulosic or other fibers, provide uniform and reproducible interpenetration of elastomeric material into the nonwoven during the molding process. Though the underlying mechanism is not understood, acrylic nonwovens, and preferably acrylic micro-fiber nonwovens, appear to be uniquely suited for this process and this application in belts.

The belt build is then subjected to curing pressures and temperatures sufficient to vulcanize and mold the belt. For example the fabrication process may include evacuating the air from inside the mold; applying steam pressure on the outside shell to a range of about 175 to 235 psig (about 1.2 to 1.62 MPa) for about 2 to 10 minutes; then applying steam pressure on the inside of the mold to a range of about 85 to 210 psig (about 0.59 to 1.45 MPa); and curing for about 10 to 20 minutes. Once cooled, the cured belt build is then separated from the mandrel and cut to the appropriate belt widths. The optimum profile shapes are achieved with process pressures on the high end of the range. Hydraulics or other methods known in the art (pneumatic, mechanical, and the like) can also be used to apply pressure to the belt, in conjunction with concurrently applied electric heat for curing in lieu of steam cure. The pressure range for a hydraulic cure may be about 85 to 500 psig (about 0.59 to 3.45 MPa). The temperature range may be about 250 to 500° F. (about 120 to 260° C.). This method including application of pressure followed by curing broadens the choice of rubber stocks to include many with relatively poor scorch safety and/or relatively high viscosity.

Pressure may be applied on a flexible outer profiled shell which presses radially inward on the belt build to form the profile, thus utilizing a rigid inner mandrel for building. Alternately, the belt may be built up on an expanding membrane on an inner mandrel such that pressure applied to the expandable membrane presses the belt slab into a ribbed or profiled outer shell mold. Application of pressure prior to curing infuses the elastomeric body or subsurface material into the nonwoven material. The elastomeric material then occupies the interstices between the individual fibers comprising the nonwoven material. This results in a region 15 of nonwoven material wherein the nonwoven material is co-mingled and interpenetrated with the elastomeric material.

Prior art nonwoven materials comprising wood-pulp and various synthetic fibers are difficult to utilize in belts because of either too much interpenetration or too little. Too much interpenetration, or "strike-through," results in a rubber surface that has less wear resistance, higher friction coefficient, more slip noise and/or generally more unstable performance than desirable for belts. It has been observed that strike-through may result when the prior art nonwoven has too much porosity, too little porosity, too little strength, or too much strength, too much tearing or hole formation in the nonwoven, and perhaps other factors are important as well. A nonwoven with too much strength and too much porosity does not deform into the shape of the mold, and the elastomer simply flows through the nonwoven, resulting in a belt with only elastomer on a pulley-engaging surface and/or incomplete profile formation or unfilled ribs. A nonwoven with too little strength tears or forms holes during molding, again resulting in only elastomer or patches of elastomer on a pulley-engaging surface. A nonwoven with too little porosity and too much strength resists strike-through, but also resists proper profile formation during molding. Surprisingly, the use of an acrylic nonwoven according to the present invention resolves these problems and provides a belt with the desired amount of penetration of elastomer into the nonwoven and a uniform molded surface with the desired amount of fiber at a pulley-engaging surface.

EXAMPLES

The following examples are submitted for the purpose of illustrating the nature of the invention and are not intended as a limitation on the scope thereof.

The first set of examples illustrate the processing improvements of the inventive belts over the prior art. The test belts comprised an overcord 7, cross-cord 8, gum layer 9, tensile cords 10, a compression section or body 11, and a nonwoven region 15 on a multi-v-ribbed profile as described in FIG. 1. The test belts used EPDM-based elastomeric materials, polyester tensile cord, nylon cross cord, and two layers of nonwoven of various compositions as indicated in Tables 1 and 2. The nonwovens in Tables 1 and 2 were produced under comparable processing conditions by a wet-laid process, with a PVAL binder. The composition percentages reported are based only on the fiber content, ignoring the binder content which comprised from about 15% to about 22% of the total nonwoven weight. For examples 4, 6, and 8, the PVAL binder included a melamine-formaldehyde (MF) resin, rubber adhesion promoter which comprised about 5% of the dry binder weight. The thickness and porosity and basis weight of the nonwovens are reported for a single layer. The example nonwovens of Table 1 utilized acrylic micro-fibers of about 0.1 dpf with diameter of about 3.5 microns, length of about 3 mm, and acrylonitrile content of 85% or greater. The cellulose was a softwood pulp with fiber diameter of about 25 to about 35 microns and fiber length of about 2 to about 4 mm. Processing into belts was evaluated using both one layer and two layers of nonwoven.

The process results were evaluated qualitatively based on observations of the quality of v-rib profile formation or mold filling, the amount of strike-through, and the patchiness of the nonwoven fiber coverage of the surface. The acrylic nonwovens in Table 1 always resulted in excellent profile formation and a high degree of fiber coverage on the surface. Typically there was no more than 5% strike-through for the acrylic nonwovens in Table 1. On the other hand, the comparative examples in Table 2 proved difficult to use and generally either had excessive strike-through or imperfect profile formation (non-fill of the mold). It may be noted from Tables 1 and 2 that the Comparative Examples were similar in basis weight, thickness, porosity, and strength (not shown) to the inventive Examples. The PET comparative example was a micro-fiber, only a little larger than the acrylic micro-fibers of the examples. Thus, the selection of acrylic fiber for the nonwoven is believed to be the most important step for producing these exceptional processing results.

TABLE 1

| Ex. No. | Example nonwoven Materials | Basis Weight (g/m$^2$) | Thickness (mm) | Porosity (cc/s/cm$^2$) | Process Results* (1 layer) | Process Results* (2 layers) |
| --- | --- | --- | --- | --- | --- | --- |
| 1 | 100% Acrylic micro-fiber | 21.8 | 0.114 | NA | Exc FS | Exc FS |
| 2 | 50/50 Acrylic/Cellulose | 16.4 | 0.074 | 43 | Exc | Exc |
| 3 | 100% Acrylic micro-fiber | 21.7 | 0.109 | 38 | Exc FS | Exc FS |
| 4 | 100% Acrylic micro-fiber + AP* | 20.0 | 0.079 | 43 | Exc | Exc |
| 5 | 70/30 Acrylic/Cellulose | 16.4 | 0.076 | 70 | Exc | Exc |
| 6 | 70/30 Acrylic/Cellulose + AP | 20.4 | 0.094 | 90 | Exc | Exc |
| 7 | 50/50 Acrylic/Cellulose | 17.6 | 0.081 | 78 | Exc | Exc |
| 8 | 50/50 Acrylic/Cellulose + AP | 21.0 | 0.089 | 91 | Exc | Exc |

*AP = MF Adhesion Promoter; FS = Uniform fiber surface; ST = unacceptable strike-through; NF = non-fill of mold; PC = patchy coverage; Exc = Excellent; NA = Not Available.

TABLE 2

| Comp. Ex. No. | Fiber of Comparative Examples | Fiber size (dpf) | Fiber Diam (μm) | Fiber Len (mm) | Basis Weight (g/m$^2$) | Thickness (mm) | Porosity (cc/s/cm$^2$) | Process Results* (1 layer) | Process Results (2 layers) |
| --- | --- | --- | --- | --- | --- | --- | --- | --- | --- |
| 1 | Polyester (PET) | 0.3 | 5.6 | 6 | 24.2 | 0.122 | 89 | ST | NF |
| 2 | PET | NA | NA | NA | 10 | 0.033 | NA | ST | ST |
| 3 | 50/50 PET/Cellulose | Same as #1 & 11 | | | 18.7 | 0.097 | 100 | ST | Fair-ST |
| 4 | Nylon | 1 | 11.2 | 6 | 23.9 | 0.178 | 229 | NF | NF |
| 5 | Nylon | NA | NA | NA | 10 | 0.028 | NA | ST | ST |
| 6 | 50/50 Nylon/Cellulose | Same as #4 & 11 | | | 17.1 | 0.099 | 164 | ST | NF |
| 7 | (Nylon/PET) 50%/Cellulose 50% | Same as #2, 4 & 11 | | | 21.3 | 0.117 | 168 | ST | NF |
| 8 | Kevlar | 1.5 | 12.1 | 6 | 25.1 | 0.246 | 315 | ST | NF |
| 9 | 50/50 Kevlar/Cellulose | Same as #8 & 11 | | | 16.9 | 0.132 | 288 | ST | ST |
| 10 | Hemp | NA | NA | NA | 10 | 0.122 | NA | ST | ST |
| 11 | 100% Cellulose | — | 25-35 | 2-4 | 4.6 | 0.033 | 51 | Good | Good-PC |

*FS = Uniform fiber surface; ST = unacceptable strike-through; NF = non-fill of mold; PC = patchy coverage; Exc = Excellent; NA = Not Available.

The second set of examples illustrates the belt performance advantages of acrylic nonwovens over prior art belts with cellulosic nonwovens. Noise, friction and durability tests were conducted on exemplary multi-v-ribbed belts constructed with the acrylic nonwovens of examples 3 through 8 of Table 1. Likewise, prior art belts having the prior art cellulosic nonwoven of comparative example 11 were tested. The results indicate that misalignment noise generated by the inventive belt is reduced significantly. The inventive belt is also quieter and exhibits a much more stable frictional behavior over time. The inventive belt is also resistant to water and exhibits a stable frictional behavior under wet testing conditions. The inventive belt also exhibits less wear on a durability tester.

The test belts comprised an overcord 7, cross-cord 8, gum layer 9, tensile cords 10, a compression section or body 11, and a nonwoven region 15 as described in FIG. 1. The test belts were all EPDM-based with polyester tensile cords, nylon cross cord, and two layers of nonwoven. The test belts had six ribs, were 0.85 inches wide, and were 1200 mm long.

Figure 3:
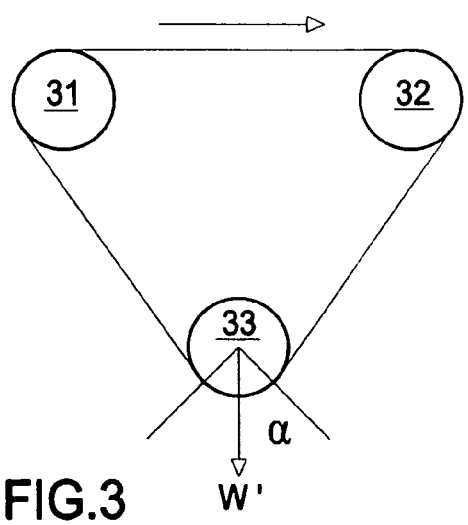
FIG. 3 depicts a forced-slip durability test pulley configuration.

The belt durability performance was tested on a forced-slip test. Before the test, and at intervals of 450 kilocycles (kc) throughout the forced-slip test, the belts were placed on a coefficient of friction (COF) tester and also on a misalignment (MA) noise tester. The forced-slip test was conducted on a three pulley system as shown in FIG. 3. Referring to FIG. 3, pulleys 31, 32 and 33 each have a diameter of 60 mm and a belt wrap α of 60 degrees. The driver pulley 31 operates at about 2000 RPM clockwise, and driver pulley 32 at about 4% lower speed than pulley 31. The ambient temperature is 23° C. A vertical load W' of 180 N/rib is applied to driven pulley 33.

Figure 4:
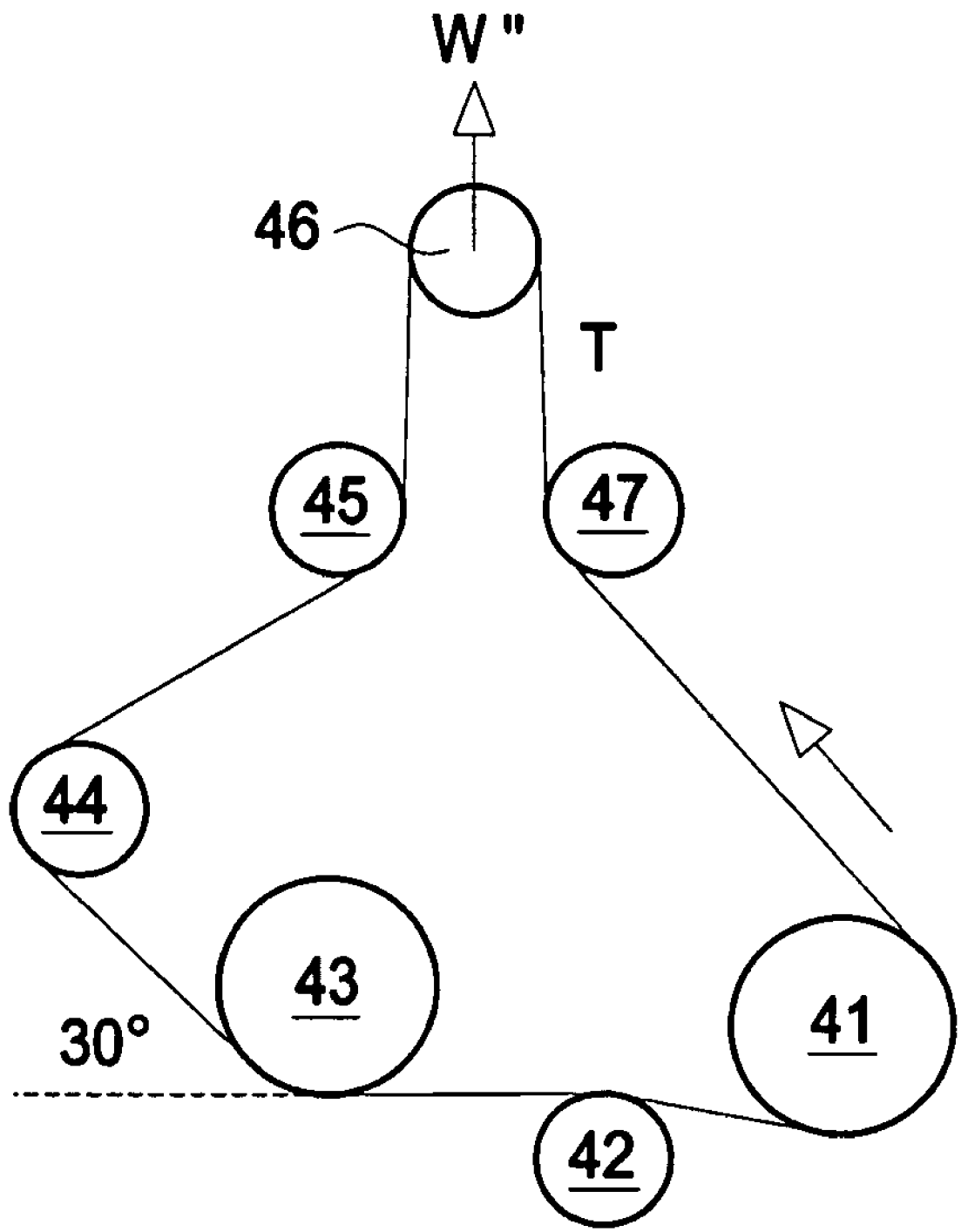
FIG. 4 depicts a coefficient of friction (COF) test pulley configuration.

The COF test was conducted on a layout as shown in FIG. 4. Referring to FIG. 4, test pulley 43 and driver pulley 41 both have a multi-v-rib profile and diameter of 141.5 mm. Pulleys 42, 45, and 47 are idlers. In a dry COF test, pulley 44 is positioned to maintain a 30-degree wrap angle on pulley 43, and driver pulley 41 is turned at 400 rpm. In a wet COF test, pulley 44 is positioned to maintain a 40-degree wrap angle on pulley 43, and driver pulley 41 is turned at 800 rpm, while water is sprayed on the belt near pulley 42 at 300 ml per minute. Weight W" of 360 N is applied to pulley 46 to provide a belt tension T of 180 N. Torque is applied to test pulley 43, ramping up from zero torque until the pulley stops turning. The COF is calculated from the maximum torque observed. The test is similar in design to SAE J2432-2000.

Figure 2:
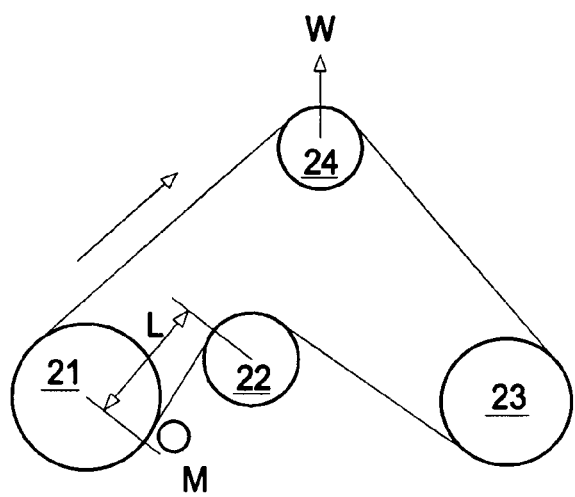
FIG. 2 depicts a misalignment noise test pulley configuration.

The misalignment noise test was conducted on a four-point drive as shown schematically in FIG. 2. Referring to FIG. 2, pulleys 21, 23, and 24 have multi-v-rib profiles and diameters of 159, 101, and 61 mm, respectively. Pulley 23 is the driver, turning at 1000 rpm clockwise. Pulley 22 is an idler with a diameter of 80 mm. Pulley 22 can be displaced perpendicular to the plane of the layout, producing a misalignment angle over span L. A tension of approximately 267 N was applied to the test belt by means of dead weight W of 489 N. Then pulley 22 was offset by a certain amount and the noise measured by microphone M. For a wet misalignment noise test, water was sprayed onto the belt surface—three squirts at each misalignment angle setting just before measuring noise.

Tables 3 and 4 depict the results of the dry and wet COF measurements during forced slip durability testing, respectively. It can be seen that the comparative belt exhibited a gradual, significant increase in COF throughout the tests. As will be seen below, a misalignment noise was heard at 450 kc and all subsequent times of MA noise testing. In contrast, the inventive belts, examples 3-8, showed only minor fluctuations in COF over the course of the durability test, and they ran quietly on the MA noise test at every stage of the durability test. Examples 3-8 retained substantially all of the surface acrylic fibers throughout the durability test. The cellulosic nonwoven layer of comparative example 11 was gradually worn off during the forced slip test, and substantially worn off by the end of the test thus exposing a significant amount of the underlying elastomeric material of the belt body. The wear of the nonwoven layer on the wet test was particularly rapid for the comparative belt. These COF test results demonstrate the efficacy of the acrylic nonwoven fabric in improving the longevity of low-noise performance of the inventive belts by providing a durable, controlled-COF fibrous rib surface.

The inventive belts of examples 3-8 all performed essentially the same (within 1 to 3 dB) on the periodic MA noise tests, so for simplicity, only the average or typical noise value in dB is reported in Table 5 and compared with comparative example 11. As can be seen from Table 5, the inventive belts ran consistently and quietly for the entire test, while the comparative belt became gradually very noisy. The final measurements at 1800 kc on some of the belts were not completed, but the trend is clear.

TABLE 3

| Ex. No. | Initial Dry COF | 450 kc Dry COF | 900 kc Dry COF | 1350 kc Dry COF | 1800 kc Dry COF |
|---|---|---|---|---|---|
| 3 | 0.96 | 0.87 | 1.00 | 1.01 | 1.08 |
| 4 | 0.91 | 1.03 | 0.95 | 1.02 | 1.17 |
| 5 | 1.28 | 1.12 | 1.18 | 1.11 | — |
| 6 | 1.17 | 1.24 | 1.35 | 1.23 | — |
| 7 | 1.45 | 1.12 | 1.19 | 1.13 | — |
| 8 | 1.45 | 1.27 | 1.32 | 1.33 | — |
| Comp 11 | 1.57 | 1.61 | 1.85 | 2.07 | — |

TABLE 4

| Ex. No. | Initial Wet COF | 450 kc Wet COF | 900 kc Wet COF | 1350 kc Wet COF | 1800 kc Wet COF |
|---|---|---|---|---|---|
| 3 | 0.51 | 0.45 | 0.38 | 0.38 | 0.38 |
| 4 | 0.64 | 0.53 | 0.45 | 0.45 | 0.45 |
| 5 | 0.57 | 0.57 | 0.54 | 0.47 | — |
| 6 | 0.65 | 0.58 | 0.59 | 0.53 | — |
| 7 | 0.64 | 0.69 | 0.63 | 0.59 | — |
| 8 | 0.65 | 0.66 | 0.66 | 0.65 | — |
| Comp. 11 | 0.81 | 0.92 | 1.01 | 1.03 | — |

TABLE 5

| Ex. No. | Test Condition | Initial dB | 450 kc dB | 900 kc dB | 1350 kc dB | 1800 kc dB |
|---|---|---|---|---|---|---|
| 3-8 | 1.5° MA Dry | 77 | 77 | 77 | 76 | 76 |
| Comp. 11 | 1.5° MA Dry | 82 | 100 | 106 | 98 | — |
| 3-8 | 2.5° MA Dry | 78 | 77 | 77 | 77 | 77 |
| Comp. 11 | 2.5° MA Dry | 95 | 109 | 110 | 107 | — |
| 3-8 | 1.5° MA Wet | 68 | 68 | 69 | 70 | 70 |
| Comp. 11 | 1.5° MA Wet | 68 | 89 | 108 | 104 | — |

Another advantage of the inventive belt is the ability to select the COF by choice of cellulose content of the acrylic nonwoven. Tables 3 and 4 illustrate the effect of cellulose content on COF. Recall from Table 1 that examples 3 and 4 are 100% acrylic fiber, examples 5 and 6 are 70% acrylic and 30% cellulosic, and examples 7 and 8 are 50/50 blends. Thus, the effect of increasing cellulosic content is to increase the COF while maintaining the good durability and low noise performance of the belt. The higher COF might be desired to increase the load capacity of the belt, or reduce slip. It should be understood that an alternate, equivalent, advantage is the ability to adjust the COF by choice of the acrylic content of the nonwoven. Thus, adjusting the acrylic content relative to the non-acrylic content of a nonwoven may have a beneficial or desirable effect on the COF of the pulley engaging surface.

One skilled in the art would recognize other useful embodiments of the invention. For example, the acrylic nonwoven described herein may be utilized for the optional jacket 6 in FIG. 1 to give the belt backside a desired frictional characteristic. As another example, the acrylic nonwoven described herein may be utilized for the optional cross cord layer 8 in FIG. 1. As another example, the acrylic nonwoven described herein may be advantageously utilized in a belt having a flocked facing layer, by using acrylic nonwoven fabric as the inner fabric layer which is covered with a short fiber flock by means of an adhesive to directly adhere the flock to the nonwoven fabric as described in U.S. Pat. No. 6,561,937. As another example, the acrylic nonwoven may be pretreated with rubber cement or RFL, or rubberized by a calendering process, in which case the coated acrylic nonwoven is adhered to the belt profile surface as described in U.S. Pat. No. 6,561,937 or U. S. Pat. No. 4,892,510, instead of being interpenetrated by or commingled with the underlying rubber of the belt body or rib. As a final example, the acrylic nonwovens described herein may be utilized in cast power transmission belts having a polymeric body of a castable urethane, such as described in U.S. Pat. No. 5,971,879 or U.S. Pat. No. 4,895,555.

Although forms of the invention have been described herein, it will be obvious to those skilled in the art that variations may be made in the construction and relation of parts without departing from the spirit and scope of the invention described herein. The invention disclosed herein may suitably be practiced in the absence of any element that is not specifically disclosed herein.

What is claimed is:

1. A belt comprising: a body comprising an elastomeric material and having tensile members running in a longitudinal direction, the body having a pulley engaging region having a profile; the pulley-engaging region having a pulley-engaging surface covered with a fibrous nonwoven fabric; characterized in that the fibers of the nonwoven fabric comprise acrylic micro-fibers having a size of about 1.5 dpf or less, or having an average diameter of about 13.5 microns or less.

2. The belt of claim 1, wherein the nonwoven fabric is commingled with the elastomeric material.

3. The belt of claim 1, wherein the acrylic micro-fibers have a size of about 1 dpf or less, or have an average diameter of about 11 microns or less.

4. The belt as in claim 1, wherein the acrylic micro-fibers have an average length of from about 1 mm to about 10 mm, and wherein the acrylic micro-fibers have a diameter of less than about 5 microns.

5. The belt as in claim 1, wherein the nonwoven fabric comprises at least about 25% acrylic fibers and nonacrylic fibers in an amount of greater than zero up to about 75% nonacrylic fibers, based on total fiber weight.

6. The belt as in claim 5, wherein the nonacrylic fibers are selected from the group consisting of synthetic fibers, natural fibers, cellulosic fibers, aramid, carbon, polyester, polyolefin, polyimide, PVAL, rayon, fiberglass, basalt, nylon, softwood pulp, hardwood pulp, cotton, hemp, wood flour, wool, silk, sisal, flax, jute, kanaf, and kapok.

7. The belt as in claim 1, wherein the nonwoven fabric comprises a chemical binder and a rubber adhesion promoter.

8. The belt as in claim 7 wherein the rubber adhesion promoter is a melamine-formaldehyde resin composition and the chemical binder is based on polyvinylalcohol (PVAL).

9. The belt as in claim 1, wherein about 100% of the fibers of the nonwoven fabric are acrylic fibers.

10. The belt as in claim 2, wherein the elastomeric material comprises a fiber loading, and wherein the fiber loading is in the range of about 0.01 to about 20 parts per hundred rubber.

11. The belt as in claim 10, wherein fiber loading fibers are selected from the group consisting of aramid, carbon, polyester, polyolefin, acrylic, polyimide, PVAL, rayon, fiberglass, and nylon or two or more of the foregoing.

12. The belt as in claim 2, wherein the pulley engaging region has a thickness of 0.025 mm to 3.0 mm.

13. The belt as in claim 2, wherein the pulley engaging region comprises at least two layers of said nonwoven fabric.

14. The belt as in claim 2, selected from a multi-v-ribbed belt, a v-belt, a toothed belt, and a flat belt.

15. A multi-v-ribbed belt comprising a body comprising an elastomeric material and having tensile members running in a longitudinal direction, the body having a pulley engaging region having a multi-v-ribbed profile; the pulley-engaging region having a pulley-engaging surface covered with a fibrous nonwoven fabric commingled with the elastomeric material; characterized in that at least about 40% by weight of the fibers of the nonwoven fabric comprise acrylic micro-fibers of less than about 1 dpf, having an average diameter less than about 11 microns, having average length of about 1 to about 6 mm, and having acrylonitrile content of at least 85% by weight; and up to about 60% of the fibers of the nonwoven fabric comprise nonacrylic fibers.

16. A method of manufacturing a belt comprising the steps of:
    laying up a first elastomeric and/or textile layer of a belt build on a mandrel;
    laying up tensile cords on the first layer;
    laying up a second elastomeric layer on the tensile cord layer;
    laying up a fibrous nonwoven fabric on the second elastomeric layer;
    curing the belt build in a profile-forming mold which deforms said nonwoven fabric without substantial tearing and forms a pulley-engaging profile region having a pulley-engaging surface layer comprising said nonwoven fabric commingled with the elastomer of said second elastomeric layer; and
    selecting for the nonwoven fabric region an acrylic nonwoven fabric, which comprises acrylic micro-fibers having a size of about 1.5 dpf or less, or having an average diameter of about 13.5 microns or less.

17. The method of claim 16 wherein the acrylic nonwoven fabric comprises at least about 25% by weight based on fiber content of acrylic micro-fibers of no more than about 1 dpf.

18. The method of claim 16 wherein the acrylic nonwoven fabric comprises nonacrylic fibers in an amount of greater than zero up to about 75% by weight nonacrylic fibers based on the total fiber content.

19. The method of claim 16 wherein the nonwoven fabric region comprises two or more layers of acrylic nonwoven fabric.

20. The belt of claim 1 wherein said nonwoven fabric covers a pulley engaging surface of said pulley engaging region.

21. The belt of claim 1 wherein said fibrous nonwoven fabric is a bonded acrylic nonwoven fabric.

22. The belt of claim 15 wherein said pulley-engaging region consists of said nonwoven fabric commingled with said elastomeric material.

23. The method of claim 16 whereby said acrylic nonwoven fabric is present at a pulley engaging surface of said belt.

24. A system comprising a multi-v-ribbed belt trained around at least one multi-v-ribbed pulley, said belt comprising: a body comprising an elastomeric material and having tensile members running in a longitudinal direction, the body having a pulley engaging region having a multi-v-ribbed profile, the surface of which is covered with a fibrous nonwoven fabric; characterized in that the fibers of the nonwoven fabric comprise acrylic fibers.

25. The system of claim 1, wherein the nonwoven fabric is commingled with the elastomeric.

26. The system of claim 1, wherein the acrylic fibers are acrylic micro-fibers having a size of about 1 dpf or less, or having an average diameter of about 11 microns or less.

* * * * *

UNITED STATES PATENT AND TRADEMARK OFFICE
CERTIFICATE OF CORRECTION

PATENT NO. : 8,197,372 B2
APPLICATION NO. : 11/399788
DATED : June 12, 2012
INVENTOR(S) : Shawn Xiang Wu and Lance C. Hall It is certified that error appears in the above-identified patent and that said Letters Patent is hereby corrected as shown below:

Column 16, Claim 25, line 4 and Claim 26, line 6, the claim reference numeral "1", each occurrence, should read --24--.

Signed and Sealed this
Sixteenth Day of July, 2013

Teresa Stanek Rea
*Acting Director of the United States Patent and Trademark Office*